United States Patent
Jang et al.

(10) Patent No.: US 9,515,799 B2
(45) Date of Patent: Dec. 6, 2016

(54) METHOD OF TRANSMITTING CONTROL INFORMATION FOR LOW-COST MACHINE TYPE COMMUNICATION, AND APPARATUS FOR SUPPORTING SAME

(71) Applicant: LG ELECTRONICS INC., Seoul (KR)

(72) Inventors: Jiwoong Jang, Anyang-si (KR); Hyunsoo Ko, Anyang-si (KR); Hangyu Cho, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/348,552

(22) PCT Filed: Sep. 28, 2012

(86) PCT No.: PCT/KR2012/007942
§ 371 (c)(1),
(2) Date: Mar. 28, 2014

(87) PCT Pub. No.: WO2013/048196
PCT Pub. Date: Apr. 4, 2013

(65) Prior Publication Data
US 2014/0269594 A1     Sep. 18, 2014

Related U.S. Application Data

(60) Provisional application No. 61/541,042, filed on Sep. 29, 2011, provisional application No. 61/541,103, filed on Sep. 30, 2011.

(51) Int. Cl.
*H04L 5/00*         (2006.01)
*H04W 72/04*    (2009.01)

(52) U.S. Cl.
CPC ........... *H04L 5/0053* (2013.01); *H04L 5/0048* (2013.01); *H04L 5/0094* (2013.01);
(Continued)

(58) Field of Classification Search
CPC .... H04W 72/042; H04L 5/0078; H04L 5/0053
(Continued)

(56) References Cited

U.S. PATENT DOCUMENTS

2009/0088148 A1* 4/2009 Chung .................. H04L 1/0029
                                                                            455/423
2010/0246518 A1* 9/2010 Gheorghiu et al. ........... 370/329
(Continued)

FOREIGN PATENT DOCUMENTS

KR   10-2010-0138852    * 12/2010
KR   10-2011-0093648       8/2011
(Continued)

OTHER PUBLICATIONS

PCT International Application No. PCT/KR2012/007942, Written Opinion of the International Searching Authority dated Jan. 31, 2013, 17 pages.

*Primary Examiner* — Siming Liu
(74) *Attorney, Agent, or Firm* — Lee, Hong, Degerman, Kang & Waimey

(57) ABSTRACT

The present invention relates to a method of transmitting downlink control information (DCI) for a low-cost machine type communication (MTC) used for a wireless access system, and apparatuses for supporting same. A method of receiving DCI for low-cost MTC equipment includes the steps of: receiving a signal including DCI format information about DCI; and receiving a physical downlink control channel (PDCCH) signal including the DCI by using the DCI formation information.

12 Claims, 14 Drawing Sheets

(52) U.S. Cl.
    CPC ........... *H04W 72/042* (2013.01); *H04L 5/001* (2013.01); *H04W 72/048* (2013.01)

(58) Field of Classification Search
    USPC ............... 370/310, 328, 329, 336, 252, 330
    See application file for complete search history.

(56) References Cited

U.S. PATENT DOCUMENTS

| | | | |
|---|---|---|---|
| 2010/0254329 A1* | 10/2010 | Pan | H04L 5/001 370/329 |
| 2010/0278106 A1* | 11/2010 | Kim et al. | 370/328 |
| 2010/0303011 A1* | 12/2010 | Pan | H04L 5/001 370/328 |
| 2011/0199905 A1 | 8/2011 | Pinheiro et al. | |
| 2012/0076088 A1* | 3/2012 | Hwang | H04W 72/1289 370/329 |
| 2013/0003604 A1* | 1/2013 | Blankenship | H04L 5/0053 370/255 |

FOREIGN PATENT DOCUMENTS

| | | |
|---|---|---|
| WO | 2010/111429 | 9/2010 |
| WO | 10-2011-0083487 | 7/2011 |

\* cited by examiner

FIG. 10
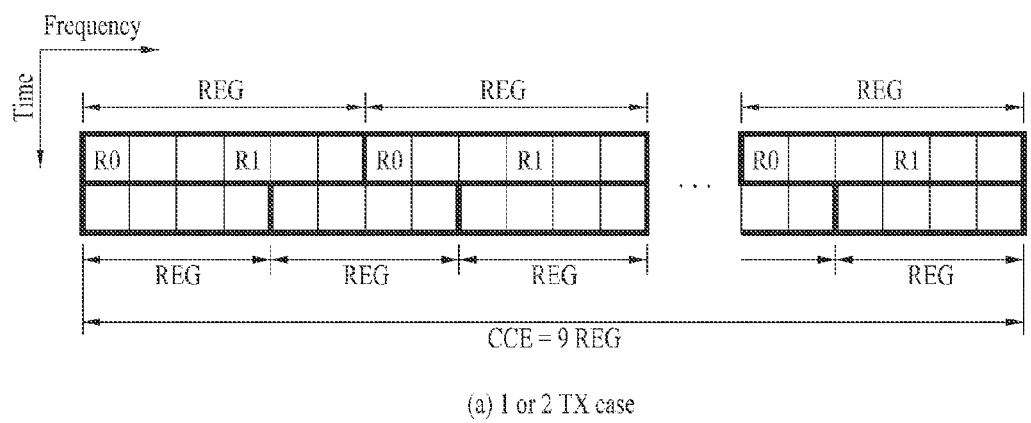
(a) 1 or 2 TX case
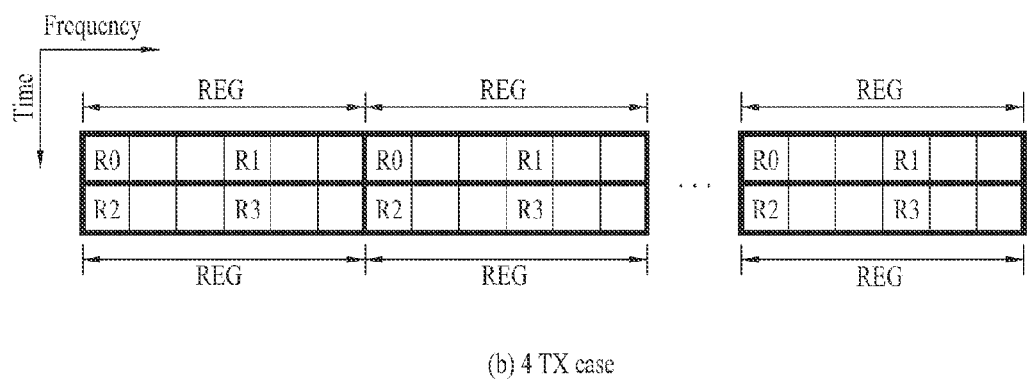
(b) 4 TX case

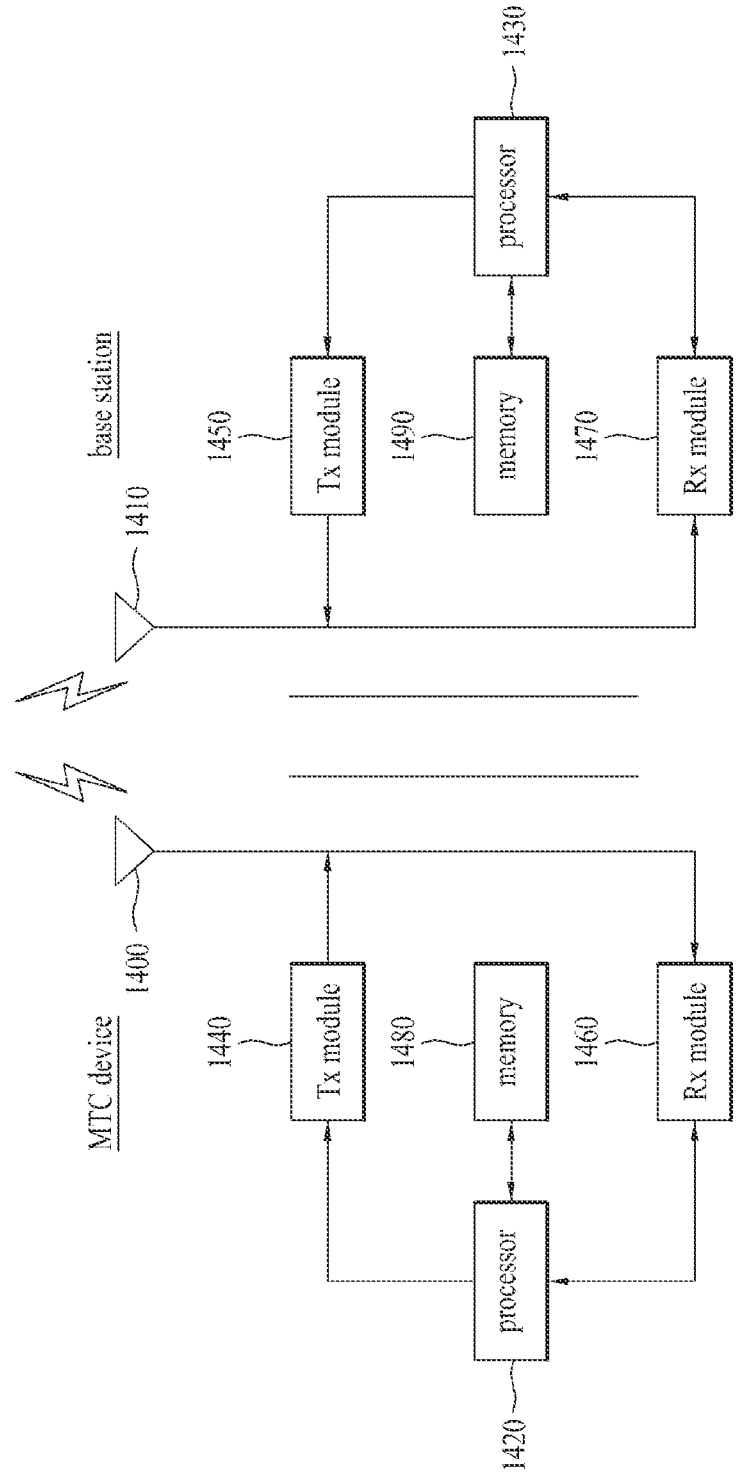

METHOD OF TRANSMITTING CONTROL INFORMATION FOR LOW-COST MACHINE TYPE COMMUNICATION, AND APPARATUS FOR SUPPORTING SAME

CROSS-REFERENCE TO RELATED APPLICATIONS

This application is the National Stage filing under 35 U.S.C. 371 of International Application No. PCT/KR2012/007942, filed on Sep. 28, 2012, which claims the benefit of U.S. Provisional Application Ser. No. 61/541,042, filed on Sep. 29, 2011, and 61/541,103, filed on Sep. 30, 2011, the contents of which are all hereby incorporated by reference herein in their entirety.

TECHNICAL FIELD

The present invention relates to a wireless access system, and more particularly, to a method for transmitting downlink control information for low cost machine type communication and an apparatus for supporting the same.

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An object of the present invention devised to solve the conventional problem is to provide a method for supporting an operation of low cost machine type communication (MTC).

Another object of the present invention is to provide a communication method for enabling an MTC device to simplify hardware for demodulation and decoding of downlink control information and reducing power consumption.

Still another object of the present invention is to provide a method for enabling an MTC device to save a search time and search process for receiving downlink control information and the power consumed for the search time and search process.

Further still another object of the present invention is to provide an apparatus for supporting the methods.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The present invention provides a method for transmitting downlink control information for low cost machine type communication used in a wireless access system and apparatuses for supporting the same.

In one aspect of the present invention, a method for receiving downlink control information (DCI) for low cost machine type communication (MTC) device comprises the steps of receiving a signal, which includes DCI format information on the DCI; and receiving a physical downlink control channel (PDCCH) signal, which includes the DCI, by using the DCI formation information. In this case, other MTC devices which belong to the same cell as that of the MTC device may use the same DCI format. However, the MTC devices may be allocated with different DCI formats in accordance with a communication environment.

In another aspect of the present invention, a low cost machine type communication (MTC) device for receiving downlink control information (DCI) for the MTC device comprises a reception module; and a processor. In this case, the processor receives a signal, which includes DCI format information on the DCI, and receives a physical downlink control channel (PDCCH) signal, which includes the DCI, by using the DCI formation information. In this case, other MTC devices which belong to the same cell as that of the MTC device may use the same DCI format. However, the MTC devices may be allocated with different DCI formats in accordance with a communication environment.

In the above aspects, the DCI format information may be received through an upper layer signal or a broadcast signal.

In still another aspect of the present invention, a method for receiving downlink control information (DCI) for low cost machine type communication (MTC) device comprises the steps of receiving an upper layer signal, which includes resource allocation information on a resource region of a physical downlink shared channel (PDSCH) to which the DCI is transmitted; and receiving a PDSCH signal, which includes the DCI transmitted through the resource region, on the basis of the resource allocation information.

In further still another aspect of the present invention, a low cost machine type communication (MTC) device for receiving downlink control information (DCI) for the MTC device comprises a reception module; and a processor. In this case, the processor receives an upper layer signal, which includes resource allocation information on a resource region of a physical downlink shared channel (PDSCH) to which the DCI is transmitted, and receives a PDSCH signal, which includes the DCI transmitted through the resource region, on the basis of the resource allocation information.

The resource region may be allocated to a first slot only of a subframe for which the PDSCH signal is transmitted.

Also, the resource region may equally be allocated to other MTC devices of a cell to which the MTC device belongs.

If a plurality of MTC devices exists in the cell to which the MTC device belongs, the DCI on the plurality of MTC devices including the MTC device may be transmitted through joint coding.

The aforementioned aspects of the present invention are only a part of the preferred embodiments of the present invention, and various embodiments based on technical features of the present invention may be devised and understood by the person with ordinary skill in the art on the basis of the following detailed description of the present invention.

Advantageous Effects

According to the embodiments of the present invention, the following advantages may be obtained.

First of all, the MTC device may simplify a hardware structure for demodulation and decoding of downlink control information, whereby power consumption may be reduced.

In addition, the MTC device may save a search time and search process for receiving downlink control information and the power consumed for the search time and search process.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 10 is a diagram illustrating a resource unit used to configure a control channel in the embodiments of the present invention;

FIG. 14 is a diagram illustrating an apparatus through which the methods described in FIGS. 1 to 13 may be implemented.

BEST MODE FOR CARRYING OUT THE INVENTION

Figure 1:
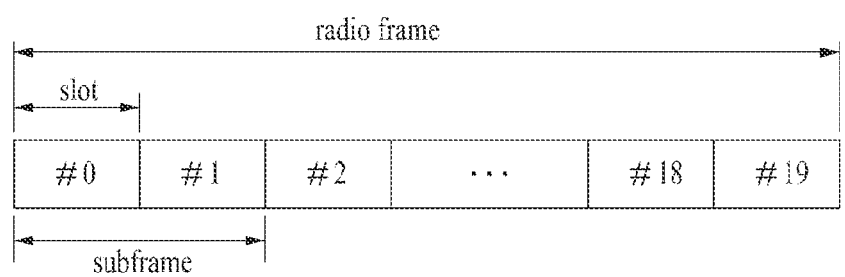
FIG. 1 is a diagram illustrating a structure of a radio frame that may be used in the embodiments of the present invention.

The present invention provides a method for transmitting downlink control information for low cost machine type communication used in a wireless access system and apparatuses for supporting the same.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In the description of drawings, procedures or steps that may make the subject matter of the present invention obscure will not be disclosed. Also, procedures or steps that may be understood by the person with ordinary skill in the art will not be disclosed.

In this specification, the embodiments of the present invention have been described based on the data transmission and reception between a base station and a mobile station. In this case, the base station means a terminal node of a network, which performs direct communication with the mobile station. A specific operation which has been described as being performed by the base station may be performed by an upper node of the base station as the case may be.

In other words, it will be apparent that various operations performed for communication with the mobile station in the network which includes a plurality of network nodes along with the base station may be performed by the base station or network nodes other than the base station. At this time, the 'base station' may be replaced with terms such as a fixed station, Node B, eNode B (eNB), an advanced base station (ABS), and an access point (AP).

Also, in the embodiments of the present invention, MTC device may be replaced with terms such as a terminal, a user equipment (UE), a mobile station (MS), a subscriber station (SS), a mobile subscriber station (MSS), a mobile terminal, or an advanced mobile station (AMS).

Furthermore, a transmitting side means a fixed and/or mobile node that provides data services or voice services while a receiving side means a fixed or mobile node that receives data services or voice services. Accordingly, in an uplink, the mobile station could be the transmitting side while the base station could be the receiving side. Likewise, in a downlink, the mobile station could be the receiving side while the base station could be the transmitting side.

The embodiments of the present invention may be supported by standard documents disclosed in at least one of wireless access systems, i.e., IEEE 802.xx system, 3GPP system, 3GPP LTE system, and 3GPP2 system. In particular, the embodiments of the present invention may be supported by documents such as 3GPP TS 36.211, 3GPP TS 36.212, 3GPP TS 36.213, and 3GPP TS 36.321. Namely, among the embodiments of the present invention, steps or parts which are not described to clarify the technical features of the present invention may be described with reference to the above standard documents. Also, all terminologies disclosed herein may be described by the above standard documents.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out.

Also, specific terminologies hereinafter used in the embodiments of the present invention are provided to assist understanding of the present invention, and various modifications may be made in the specific terminologies within the range that they do not depart from technical spirits of the present invention.

The following technology may be applied to various wireless access systems such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA).

The UTRA is a part of a universal mobile telecommunications system (UMTS). A $3^{rd}$ generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) system is an evolved version of the 3GPP LTE system. For clarification of the description of technical features of the present invention, the embodiments of the present invention will be described based on the 3GPP LTE/LTE-A system. However, it is to be understood that the embodiments of the present invention may be applied to IEEE 802.16e/m system.

1. 3GPP LTE/LTE-A System

In a wireless access system, a user equipment receives information from a base station through a downlink (DL), and also transmits information to the base station through an uplink. Examples of information transmitted and received between the user equipment and the base station include data and various kinds of control information. Various physical channels exist depending on types and usage of information transmitted or received between the user equipment and the base station.

FIG. 1 is a diagram illustrating a structure of a radio frame that may be used in the embodiments of the present invention.

The radio frame includes 10 subframes, each of which includes two slots.

A time required to transmit one subframe will be referred to as a transmission time interval (TTI). At this time, one subframe has a length of 1 ms, and one slot has a length of 0.5 ms.

One slot includes a plurality of OFDM symbols in a time domain and a plurality of resource blocks (RB) in a frequency domain. OFDM symbols are intended to represent one symbol interval in the 3GPP LTE system that uses an orthogonal frequency division multiplexing access (OFDMA) on a downlink. Namely, the OFDM symbols may be referred to as SC-FDMA symbols or symbol interval in accordance with a multiplexing access mode. The resource block (RB) is a resource allocation unit and includes a plurality of continuous subcarriers in one slot.

The aforementioned structure of the radio frame of FIG. 1 is only exemplary, and various modifications may be made in the number of subframes included in the radio frame, the number of slots included in the subframe, or the number of OFDM symbols included in the slot.

Figure 2:
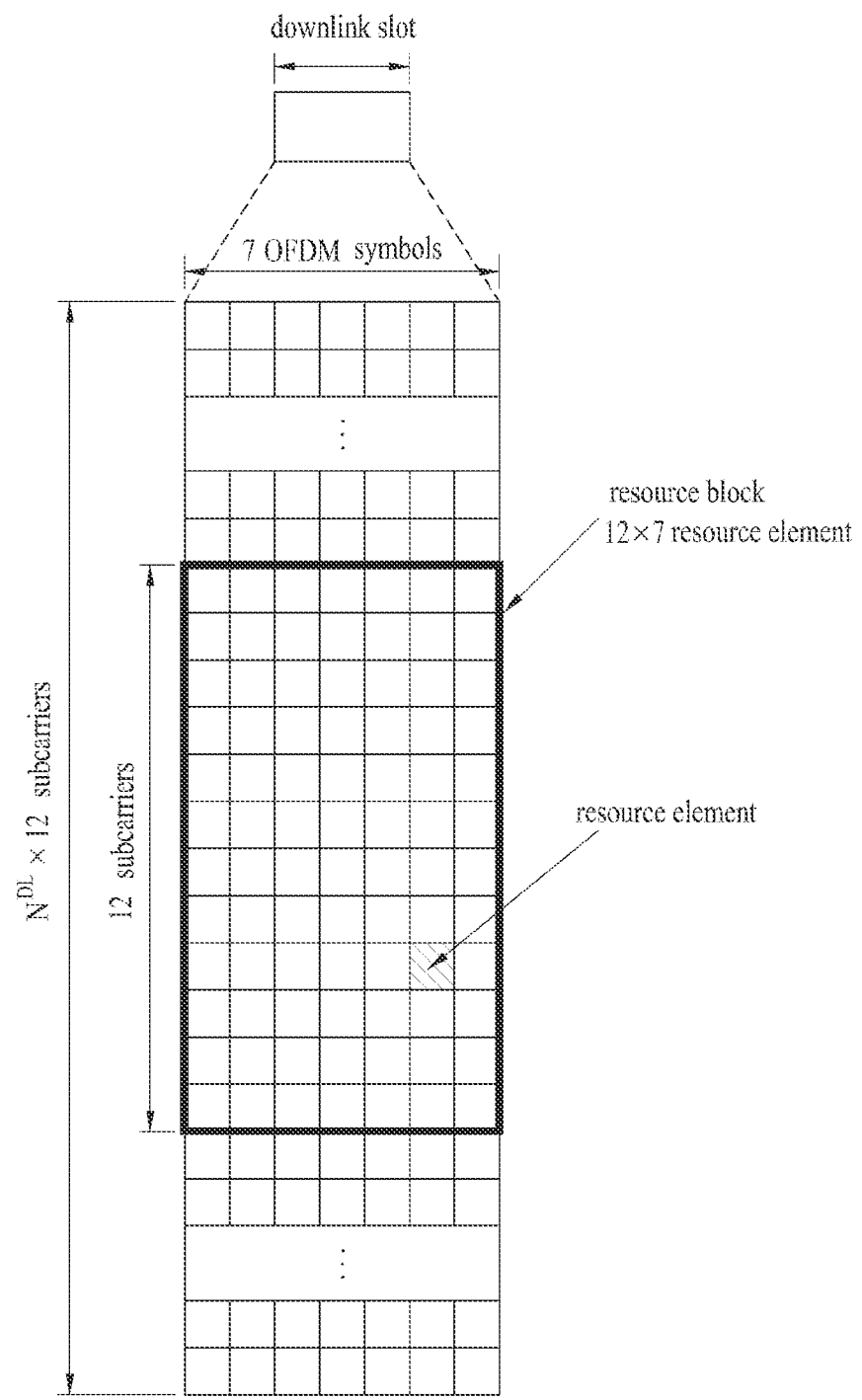
FIG. 2 is a diagram illustrating a resource grid of one downlink slot that may be used in the embodiments of the present invention.

FIG. 2 is a diagram illustrating a resource grid of one downlink slot that may be used in the embodiments of the present invention.

The downlink slot includes a plurality of OFDM symbols in a time domain. In FIG. 2, one downlink slot includes seven OFDM symbols, and one resource block includes twelve subcarriers in a frequency domain.

Each element on the resource grid will be referred to as a resource element (RE), and one resource block (RB) includes 12×7 resource elements. The number $N^{DL}$ of resource blocks (RBs) included in the downlink slot depends on a downlink transmission bandwidth.

Figure 3:
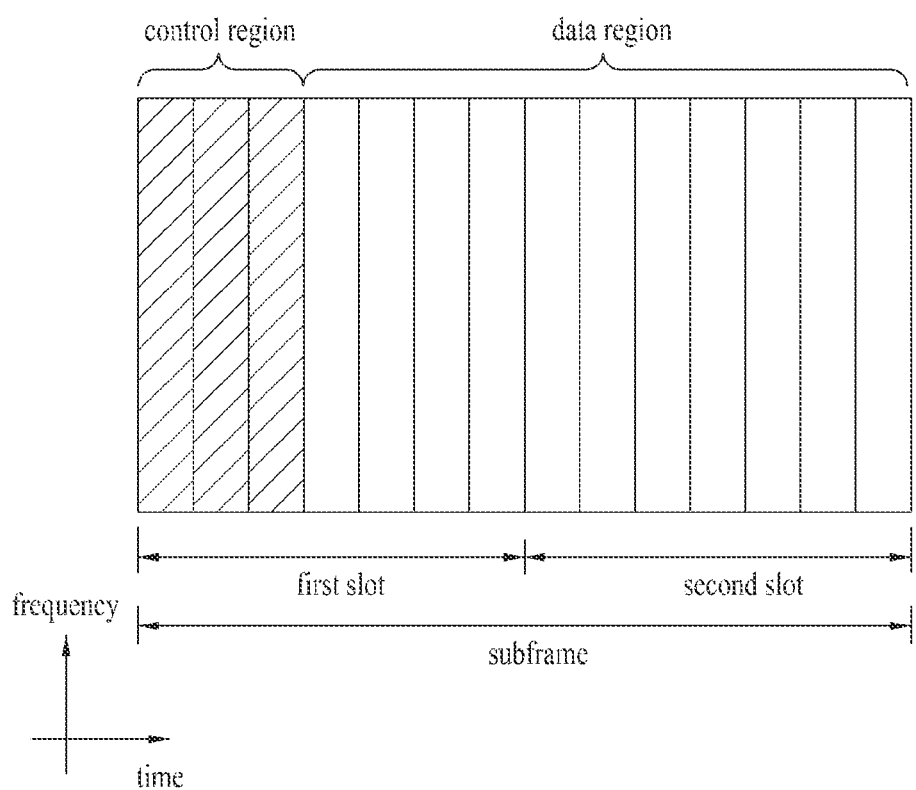
FIG. 3 is a diagram illustrating a structure of a downlink subframe that may be used in the embodiments of the present invention.

FIG. 3 is a diagram illustrating a structure of a downlink subframe that may be used in the embodiments of the present invention.

The subframe includes two lots in the time domain. Maximum three OFDM symbols located at the front of the first slot of the subframe correspond to a control region to which control channels are allocated. The other OFDM symbols correspond to a data region to which a physical downlink shared channel (PDSCH) is allocated.

Examples of the downlink control channel used in the 3GPP LTE system include a PCFICH (Physical Control Format Indicator CHannel), a PDCCH (Physical Downlink Control CHannel), and a PHICH (Physical Hybrid ARQ Indicator CHannel). The PCFICH signal transmitted from the first OFDM symbol of the subframe carries information on the number (that is, size of control region) of OFDM symbols used for transmission of a control channel signal within the subframe. The PHICH carries ACK/NACK (acknowledgement/negative-acknowledgement) signal for uplink HARQ (hybrid automatic repeat request). In other words, ACK/NACK signal of uplink data transmitted from the user equipment (UE) is transmitted onto the PHICH.

The control information transmitted through the PDCCH will be referred to as downlink control information (DCI). The DCI includes resource allocation information for a user equipment (UE) or user equipment group and other control information. For example, the DCI may include uplink resource allocation information, downlink resource allocation information, and uplink transmission power control command.

The PDCCH may carry transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission power control commands of individual user equipments (UEs) within a random user equipment group, a transmission power control command, activity information of voice over Internet protocol (VoIP), etc.

A plurality of PDCCHs may be transmitted within the control region, and the user equipment may monitor the plurality of PDCCHs. The PDCCH may be transmitted on one or more continuous control channel elements (CCEs). The CCE is a logic allocation unit used to provide the PDCCH at a coding rate based on the status of a radio channel. The CCE corresponds to a plurality of resource element groups (REGs). The format of the PDCCH and the number of available bits of the PDCCH are determined depending on the correlation between the number of CCEs and a coding rate provided by the CCE. The base station determines a PDCCH format depending on the DCI, which will be transmitted to the user equipment, and attaches cyclic redundancy check (CRC) to the control information.

The CRC is masked with an identifier (for example, radio network temporary identifier (RNTI)) depending on usage of the PDCCH or owner of the PDCCH. If the PDCCH is for a specific user equipment, a unique identifier (for example, cell-RNTI (C-RNTI) of the corresponding user equipment may be masked with the CRC. If the PDCCH is for a paging message, a paging indicator identifier (P-RNTI) may be masked with the CRC. Also, if the PDCCH is for system information (in more detail, system information block), system information identifier and system information RNTI (SI-RNTI) may be masked with the CRC. In order to indicate a random access response which is the response to reception of a random access preamble of the user equipment, a random access RNTI (RA-RNTI) may be masked with the CRC.

In a carrier aggregation environment, the PDCCH may be transmitted through one or more component carriers, and may include resource allocation information on one or more component carriers. For example, although the PDCCH is transmitted through one component carrier, the PDCCH may include resource allocation information on the PDSCH and the PUSCH.

Figure 4:
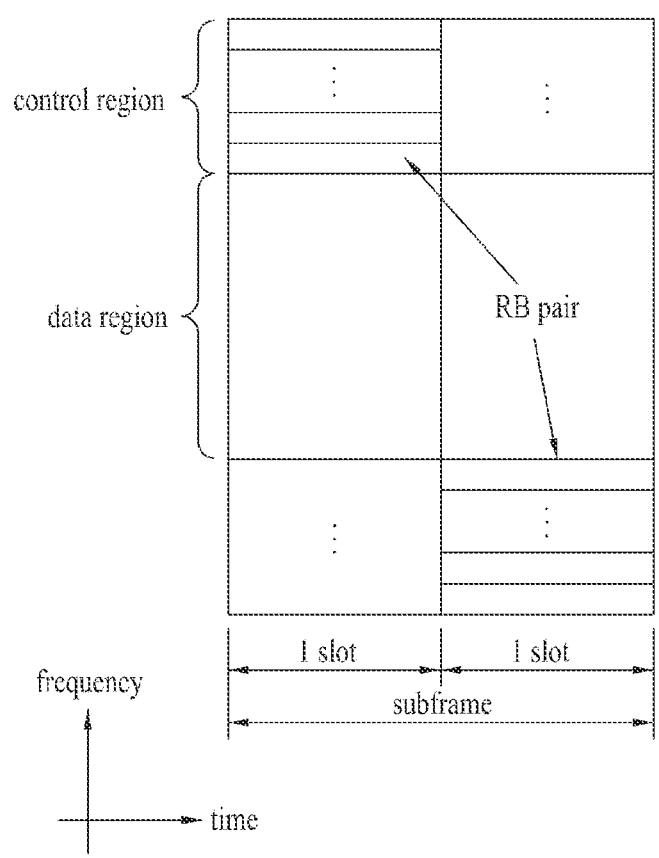
FIG. 4 is a diagram illustrating a structure of an uplink subframe that may be used in the embodiments of the present invention.

FIG. 4 is a diagram illustrating a structure of an uplink subframe that may be used in the embodiments of the present invention.

Referring to FIG. 4, the uplink subframe includes a plurality of slots (for example, two). Each slot may include a plurality of SC-FDMA symbols, wherein the number of SC-FDMA symbols included in each slot is varied depending on a cyclic prefix (CP) length. The uplink subframe is divided into a data region and a control region in a frequency domain. The data region includes a PUSCH, and is used to transmit a data signal that includes voice information. The control region includes a PUCCH, and is used to transmit uplink control information (UCI). The PUCCH includes RB pair located at both ends of the data region on a frequency axis, and performs hopping on the border of the slots.

In the LTE system, the user equipment does not transmit a PUCCH signal and a PUSCH signal at the same time to maintain single carrier features. However, in the LTE-A system, the PUCCH signal and the PUSCH signal may be transmitted at the same time for the same subframe in accordance with a transmission mode of the user equipment, wherein the PUCCH signal may be subjected to piggyback for the PUSCH signal.

The PUCCH for one user equipment is allocated to resource block (RB) pair for one subframe. Resource blocks (RBs) belonging to the RB pair reserve different subcarriers for two slots. The RB pair allocated to the PUCCH is subjected to frequency hopping at a slot boundary.

The PUCCH may be used to transmit the following control information.

SR (Scheduling Request): is information used to request uplink UL-SCH resource. The SR is transmitted using an on-off keying (OOK) system.

HARQ ACK/NACK: is a response signal to the PDCCH indicating semi-persistent scheduling (SPS) release and a downlink data packet on the PDSCH. HARQ ACK/NACK represents whether the PDCCH indicating SPS release or the downlink data packet has been successfully received. ACK/NACK 1 bit is transmitted in response to a single downlink codeword (CW), and ACK/NACK 2 bits are transmitted in response to two downlink codewords. In case of TDD, ACK/NACK responses to a plurality of downlink subframes are collected, whereby the ACK/NACK responses are transmitted from one PUCCH through bundling or multiplexing.

CQI (Channel Quality Indicator) or CSI (Channel State Information): is feedback information on a downlink channel. MIMO (Multiple input Multiple Output) related feedback information includes a rank indicator (RI) and a precoding matrix indicator (PMI). 20 bits per subframe are used. In the embodiments of the present invention, CSI may be used as a concept that includes CQI, RI and PMI.

The quantity of the uplink control information (UCI) that may be transmitted from the user equipment for the subframe depends on the number of SC-FDMA symbols available for control information transmission. The SC-FDMA symbols available for control information transmission mean the remaining SC-FDMA symbols except for SC-FDMA symbols for reference signal transmission for the subframe, and the last SC-FDMA symbol of the subframe is excluded in case of the subframe for which a sounding reference signal (SRS) is set. The reference signal is used for coherent detection of the PUCCH. The PUCCH supports seven formats in accordance with information which is transmitted.

Table 1 illustrates a mapping relation between the PUCCH format and the UCI in the LTE system.

TABLE 1

| PUCCH format | Uplink control information (UCI) |
| --- | --- |
| Format 1 | Scheduling Request (SR) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK for extended CP |
| Format 2a | CQI and 1-bit HARQ ACK/NACK |
| Format 2b | CSI and 2-bit HARQ ACK/NACK |

Figure 5:
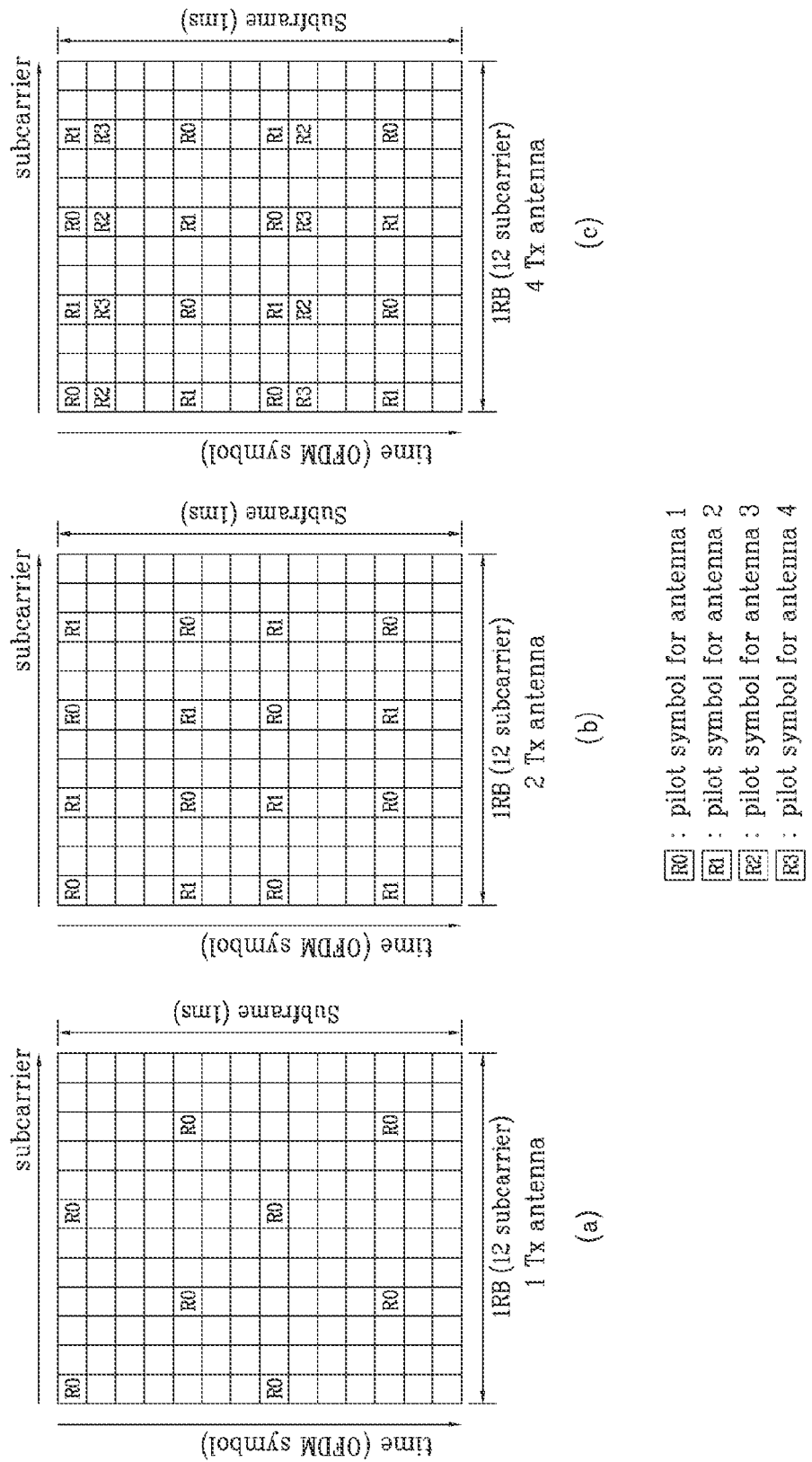
FIG. 5 is a diagram illustrating an example of a pilot symbol structure based on the number of transmitting antennas that may be used in the embodiments of the present invention.

FIG. 5 is a diagram illustrating an example of a pilot symbol structure based on the number of transmitting antennas that may be used in the embodiments of the present invention.

A pilot symbol is generally used in the field of data transmission. The pilot symbol is a signal used by a transmitting side and a receiving side to obtain timing for various channels or reference carrier for demodulation. In various communication systems, the pilot symbol may be used as various terms such as reference signal (RS). However, in the embodiments of the present invention, the pilot symbol means all the symbols or signals having no actual data, transmitted at high output to synchronize channels, synchronize phase of carriers, or assist acquisition of base station information.

FIG. 5 illustrates a position of a pilot symbol of each transmitting antenna in accordance with the number of new antennas. In FIG. 5, Ri represents a pilot symbol of the ith transmitting antenna. Also, FIG. 5(a) illustrates that one transmitting antenna is used, FIG. 5(b) illustrates that two transmitting antennas are used, and FIG. 5(c) illustrates that four transmitting antennas are used.

In FIG. 5, it is noted that each pilot symbol is arranged at a constant frequency interval and a constant time interval. If the number of transmitting antennas is increased as shown in FIG. 5, overhead of the pilot symbol may be increased.

If a structure of the pilot symbol of FIG. 5 is used for a first sector (sector 1) of the base station, the pilot symbol may be protected through shift of subcarrier unit or OFDM symbol unit in the frequency domain or the time domain, whereby pilot symbols may not collide with each other between cells in second and third sectors. Hereinafter, a method for removing interference through shift of a pilot channel in a subcarrier unit or OFDM symbol unit will be described.

Figure 6:
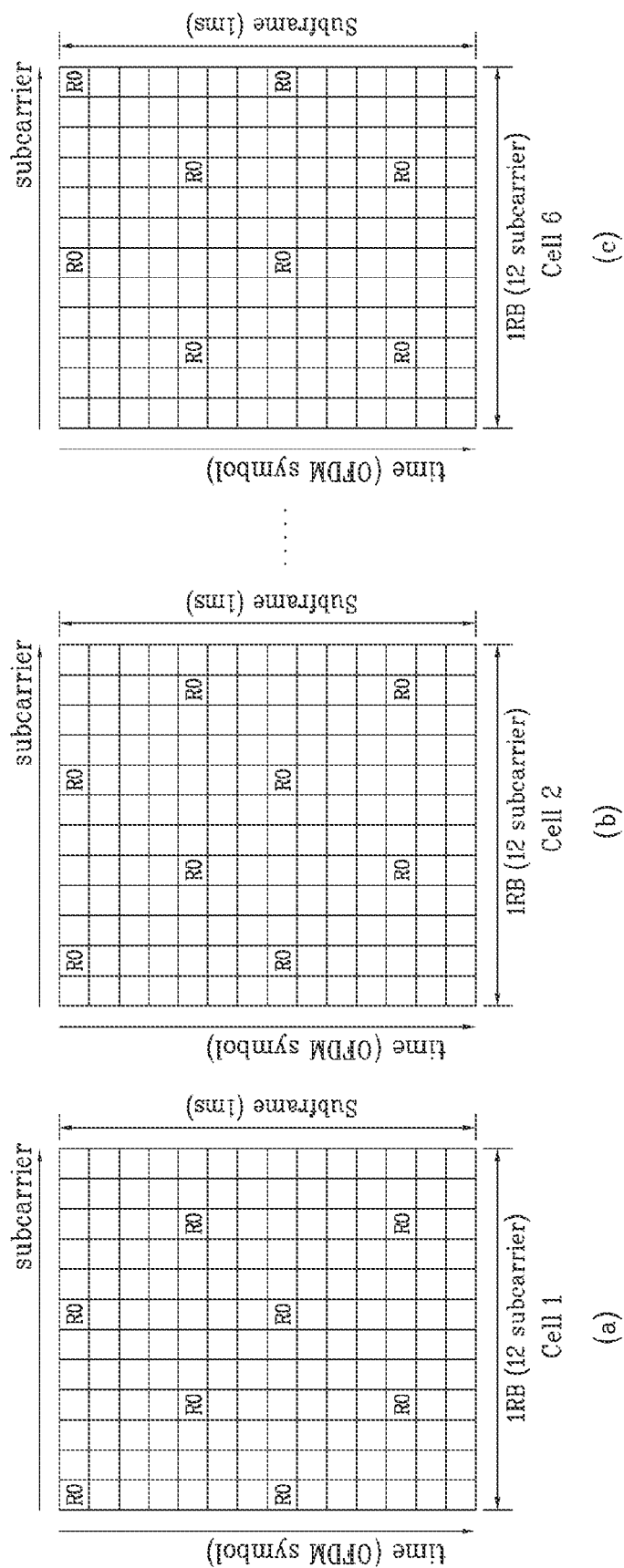
FIG. 6 is a diagram illustrating an example of a method for shifting a pilot symbols in a unit of subcarrier if one transmitting antenna is used.

FIG. 6 is a diagram illustrating an example of a method for shifting a pilot symbols in a unit of subcarrier if one transmitting antenna is used.

Referring to FIG. 6, it is noted that each pilot symbol is located at an interval of six subcarriers in a frequency domain in case of a transmitting antenna (1 Tx antenna) of FIG. 6(a). Accordingly, if shift of a subcarrier unit is performed in the frequency domain, at least five cells may arrange the pilot symbols at different positions. In other words, in FIG. 6, it is noted that several neighboring cells Cell 1 to Cell 6 avoid collision of the pilot symbols through frequency shift.

Figure 7:
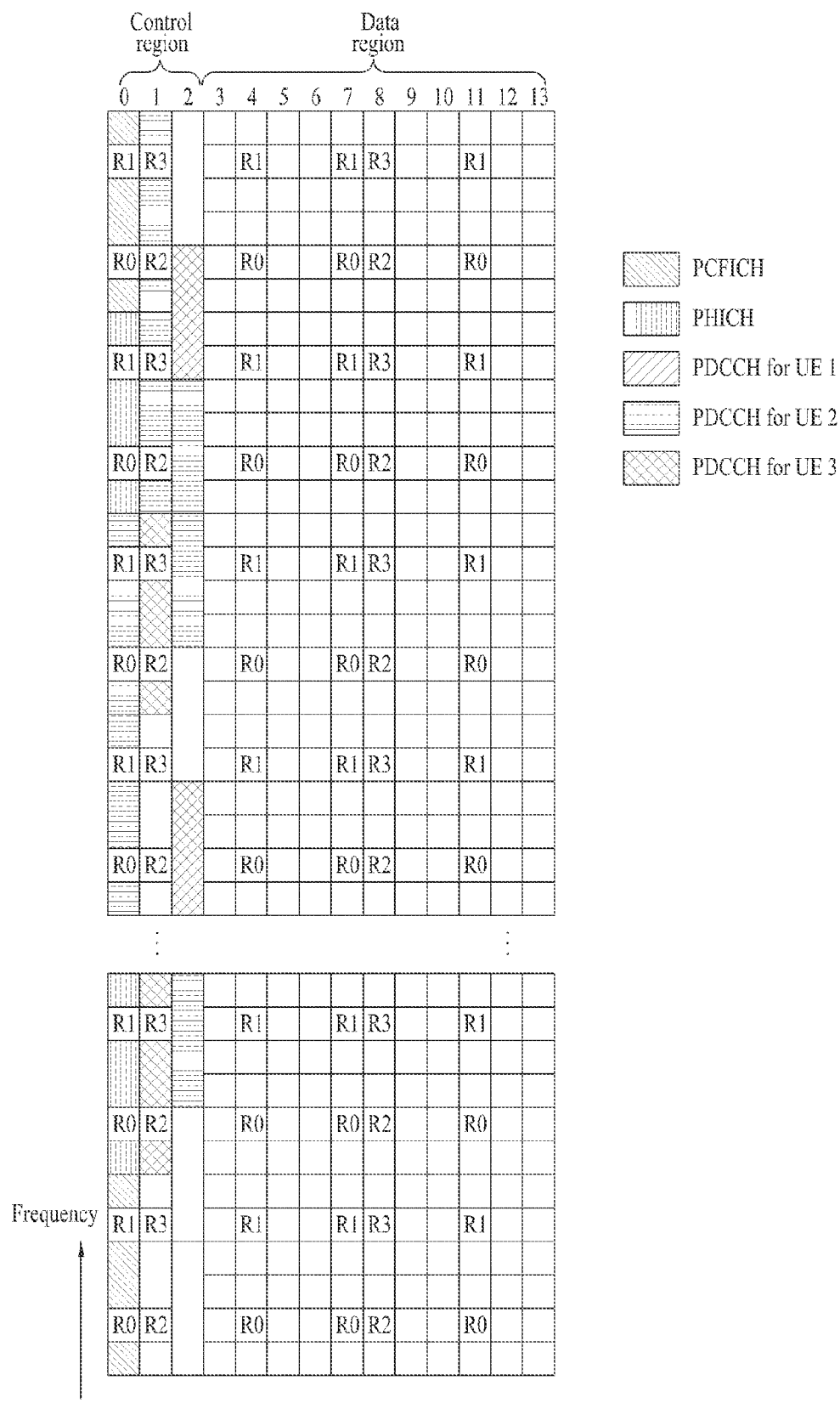
FIG. 7 is a diagram illustrating an example of allocation of control channels, which may be used in the embodiments of the present invention, to a downlink subframe.

FIG. 7 is a diagram illustrating an example of allocation of control channels, which may be used in the embodiments of the present invention, to a downlink subframe.

Referring to FIG. 7, the subframe includes 14 OFDM symbols. First three OFDM symbols of the subframe are used as a control region, and the other 11 OFDM symbols are used as a data region. In FIG. 7, R0 to R3 represent common reference signals (CRS) of antennas 0 to 3. The CRS is fixed by a given pattern within the subframe regardless of the control region and the data region. The control channel is allocated to a resource of the control region, to which the CRS is not allocated, and a traffic channel is also allocated to a resource of the data region, to which the CRS is not allocated. Examples of the control channel allocated to the control region include (1) a Physical Control Format Indicator Channel (PCFICH) used to coordinate the number of OFDM symbols for a downlink control channel per subframe, (2) a Physical Hybrid-ARQ Indicator Channel (PHICH) which transmits ACK/NACK of a downlink, and (3) a Physical Downlink Control Channel (PDCCH) for transmitting control information for transmission and reception of downlink/uplink data.

Figure 8:
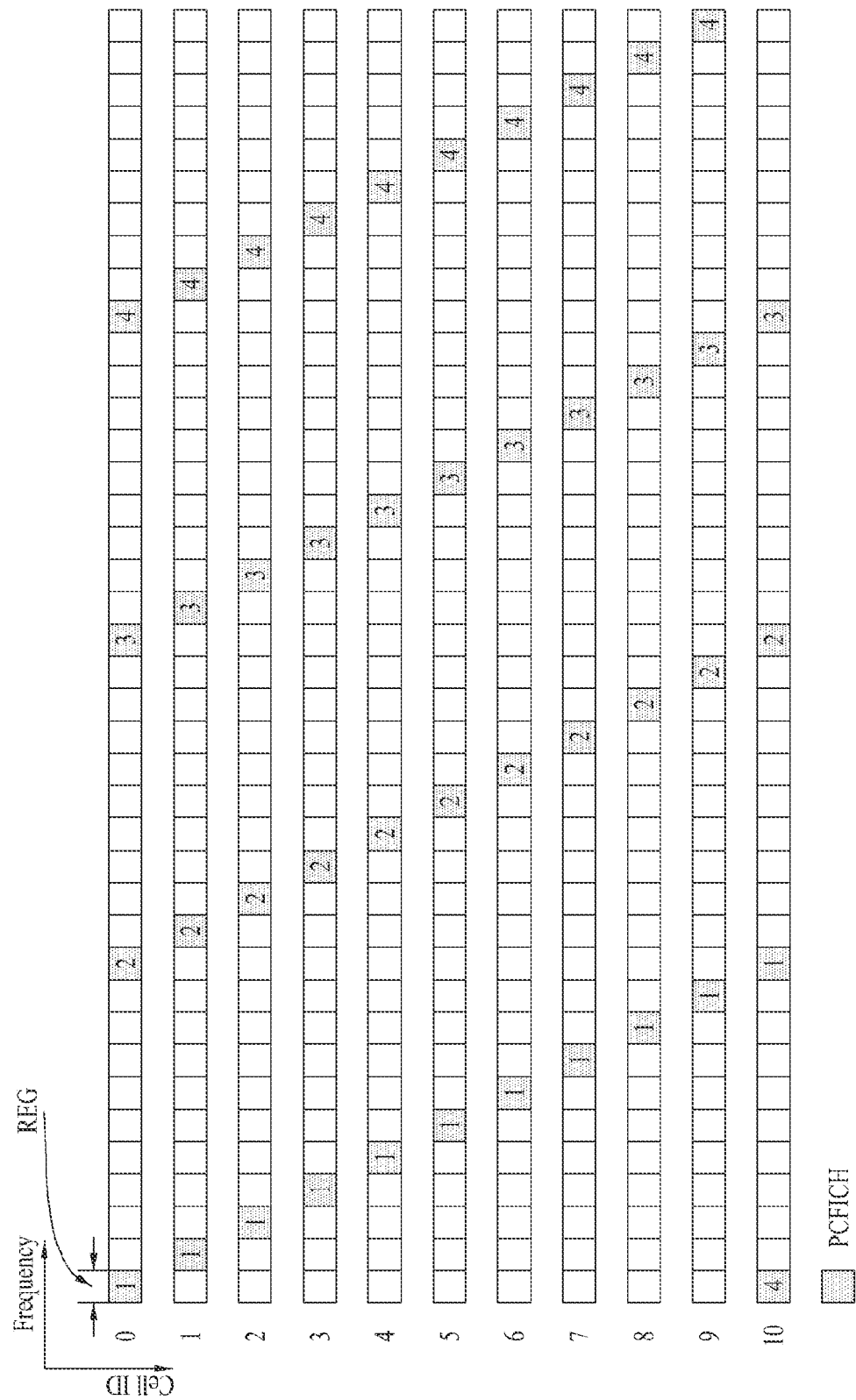
FIG. 8 is a diagram illustrating an example of transmitting a PCFICH signal of control channels, which may be used in the embodiments of the present invention.

FIG. 8 is a diagram illustrating an example of transmitting a PCFICH signal of control channels, which may be used in the embodiments of the present invention.

The PCFICH notifies the user equipment of the number of OFDM symbols used in the PDCCH per subframe. The PCFICH is located in the first OFDM symbol. The PCFICH includes four resource element groups (REGs), each of which is distributed in the control region on the basis of cell ID. One REG includes four resource elements (REs). The PCFICH should be transmitted per subframe, has a value of 1 to 3 and is modulated by 16 Quadrature Phase Shift Keying (QPSK).

The following Table 2 illustrates a control format indicator (CFI) transmitted through the PCFICH.

TABLE 2

| CFI | CFI codeword $<b_0, b_1, \ldots, b_{31}>$ |
|---|---|
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

Referring to Table 2, if the CFI is 1, it is noted that the PDCCH is transmitted to the 0th OFDM symbol only, and if the CFI is 2 or 3, it is noted that the PDCCH is transmitted to the 0th to 1st OFDM symbol or the 0th to 2nd OFDM symbol.

The CFI value set in Table 2 may be defined differently depending on a bandwidth. For example, if a bandwidth of the system is smaller than a specific threshold value, it is noted that CFI=1, 2 and 3 represent that 2, 3 and 4 OFDM symbols are used for the PDCCH.

In FIG. 8, REG includes four subcarriers. At this time, REG used for the PCFICH includes data subcarriers except for the reference signal (RS), and is generally used by using a transmit diversity scheme. Also, the REG is used by frequency shift so that its position may not affect interference between the cells. Additionally, since the PCFICH is always transmitted to the first OFDM symbol of the subframe, the user equipment or the receiver first identifies information of the PCFICH during decoding of each subframe, and then receives the information of the PDCCH in accordance with the PCFICH signal.

Figure 9:
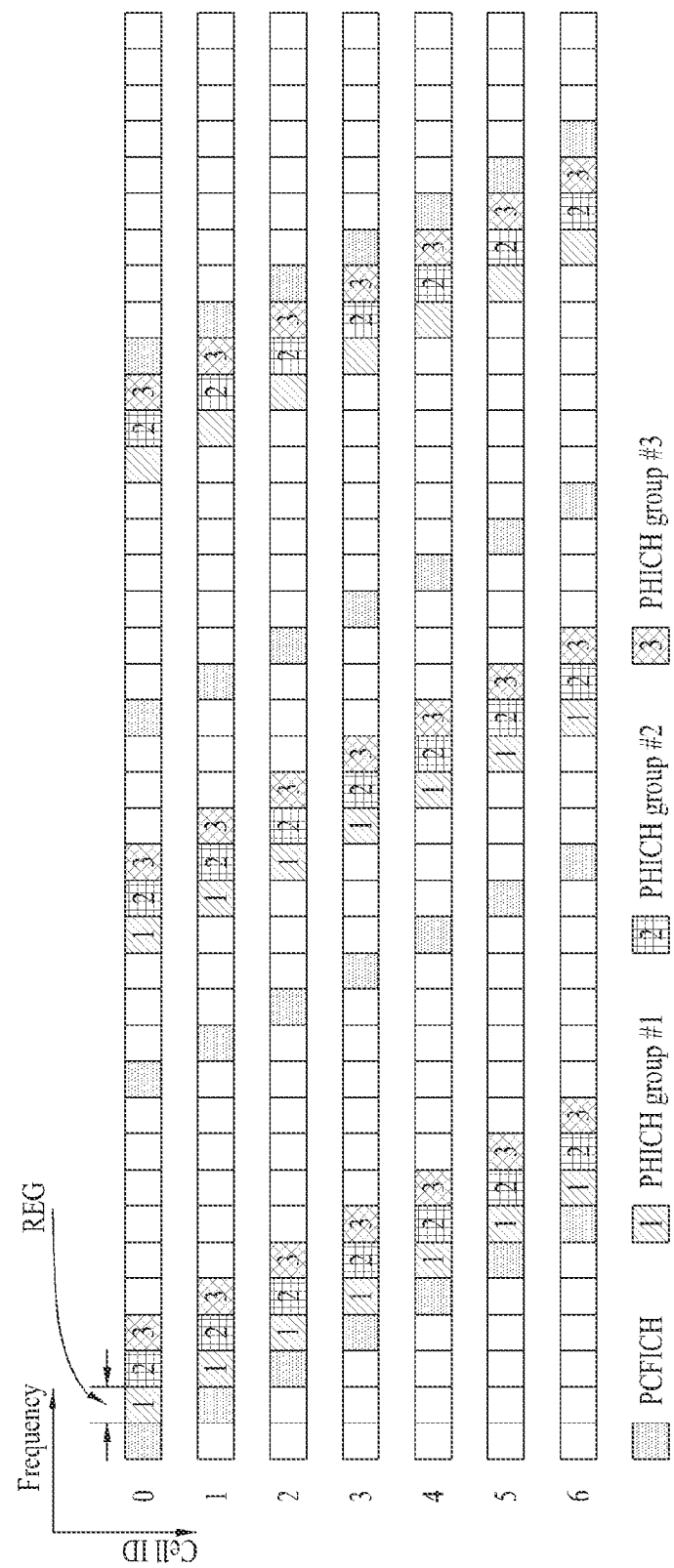
FIG. 9 is a diagram illustrating an example of transmitting a PHICH signal of control channels, which may be used in the embodiments of the present invention.

FIG. 9 is a diagram illustrating an example of transmitting a PHICH signal of control channels, which may be used in the embodiments of the present invention.

The PHICH is a physical hybrid-automatic repeat and request (HARQ) indicator channel and is used to carry HARQ ACK/NACK signals for uplink transmission. The PHICH includes three REGs, and is cell-specifically scrambled. ACK/NACK information is indicated by 1 bit, and is spread by a spreading factor (SF) of 4 and repeated three times. A plurality of PHICHs may be mapped with the same resource, and is modulated by binary phase shift keying (BPSK).

FIG. 9 illustrates an al location position of the PCFICH and the PHICH at a specific bandwidth. The PHICH is intended to transmit ACK/NACK information on the uplink data channel. A plurality of PHICH groups may be generated for one subframe, and a plurality of PHICHs may be included in one PHCIH group. Accordingly, one PHICH group includes PHICH channels for several user equipments.

PHICH allocation from several PHICH groups to each user equipment shown in FIG. 9 is performed using the lowest physical resource block (PRB) index of PUSCH resource allocation and cyclic shift of a demodulation RS (DMRS) transmitted through uplink (UL) grant. The PHICH resource is notified through an index pair such as ($n_{PHICH}^{group}$, $n_{PHICH}^{seq}$). At this time in the index pair ($n_{PHICH}^{group}$, $n_{PHICH}^{seq}$), $n_{PHICH}^{group}$ means a PHICH group number, and $n_{PHICH}^{seq}$ means an orthogonal sequence index within the corresponding PHICH group. An example of orthogonal sequences used in the 3GPP LTE system is as illustrated in Table 3 below.

TABLE 3

| Sequence index $n_{PHICH}^{seq}$ | Orthogonal sequence | |
| --- | --- | --- |
| | Normal cyclic prefix $N_{SF}^{PHICH} = 4$ | Extended cyclic prefix $N_{SF}^{PHICH} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

The following Equation 1 represents a method for obtaining an element included in the index pair indicating the PHICH resource.

$$n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DMRS}) \bmod 2N_{SF}^{PHICH}$$

[Equation 1]

In the Equation 1, $n_{DMRS}$ is a cyclic shift value of the DMRS used for UL transmission associated with the PHICH. $N_{SF}^{PHICH}$ is a size of a spreading factor used for the PHICH. $I_{PRB\_RA}^{lowest\_index}$ is the lowest PRB index for uplink resource allocation. $N_{PHICH}^{group}$ represents the number of PHICH groups.

$N_{PHICH}^{group}$ used in the Equation 1 represents the number of PHICH groups, and may be calculated by the following Equation 2.

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases}$$

[Equation 2]

In the Equation 2, $N_g$ is information related to the quantity of PHICH resources transmitted to a physical broadcast channel (PBCH) and expressed as ($N_g \in \{1/6, 1/2, 1, 2\}$) of 2-bit size. Additionally, the PHICH group may include different time domains within one subframe in accordance with PHICH duration.

FIG. 10 is a diagram illustrating a resource unit used to configure a control channel in the embodiments of the present invention.

FIG. 10(a) illustrates that the number of transmitting antennas is 1 or 2, and FIG. 10(b) illustrates that the number of transmitting antennas is 4. Although CRS patterns of FIG. 10(a) and FIG. 10(b) are different from each other in accordance with the number of transmitting antennas, a configuration method of a resource unit related to a control channel is equally applied to FIG. 10(a) and FIG. 10(b). Referring to FIGS. 10(a) and 10(b), a resource unit for the control channel is REG. The REG includes four neighboring resource elements excluding the common reference signal (CRS). The REG is illustrated with a solid line. The PCFICH and the PHICH include four REGs and three REGs, respectively. The PDCCH is configured in a unit of CCE (control channel element), one CCE including nine REGs. Although FIG. 10 illustrates that REGs constituting CCE adjoin one another, nine REGs constituting CCE may be spread.

Figure 11:
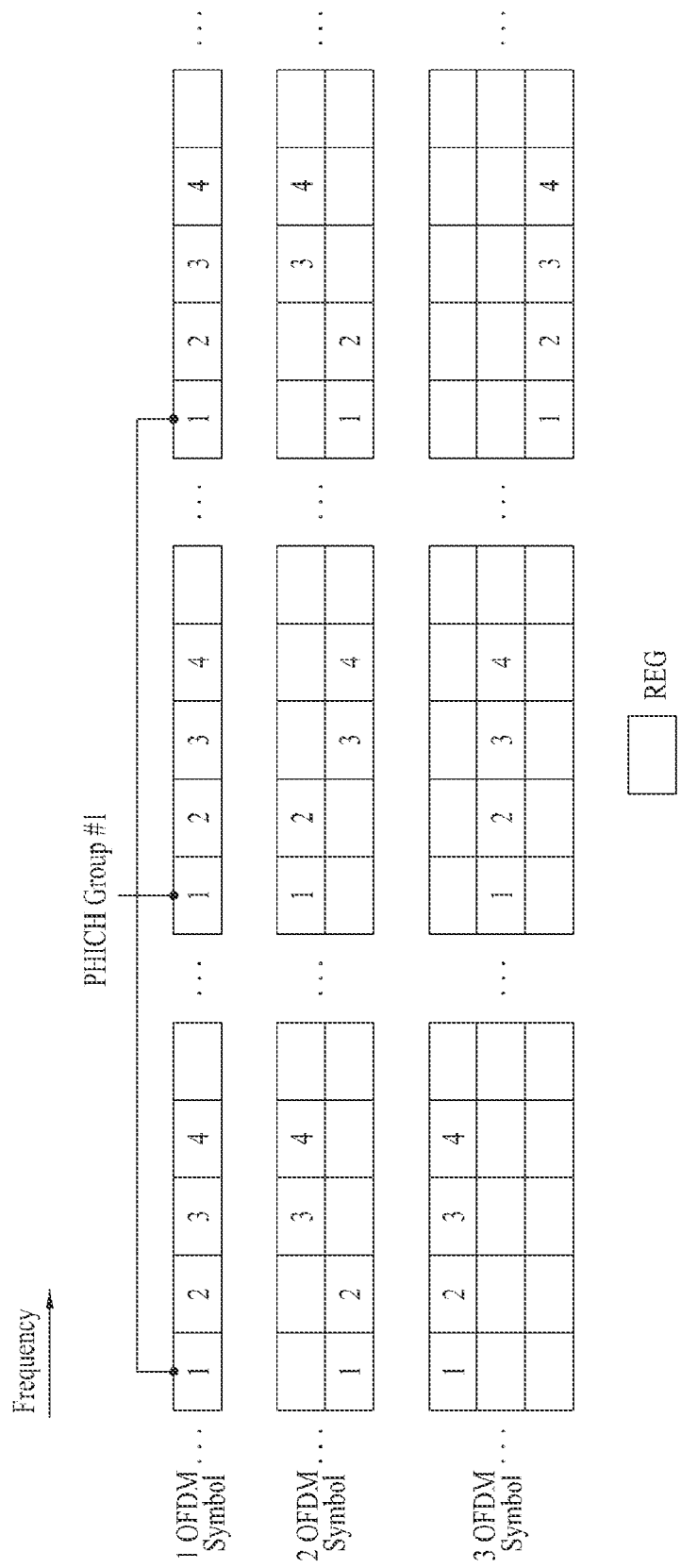
FIG. 11 is a diagram illustrating an example of allocation of a PHICH within a control region in the embodiments of the present invention.

FIG. 11 is a diagram illustrating an example of allocation of a PHICH within a control region in the embodiments of the present invention.

Allocation of the PHICH is affected by the PCFICH. Although a start position of the PCFICH is varied in accordance with cell ID as illustrated in Table 1, the PCFICH is transmitted using four REGs at a quartered equivalent interval of all subcarriers of the first OFDM symbol. The PHICH is defined for REG remaining after the PCFICH is allocated. The PHICH groups are allocated continuously at a specific start position by dividing the remaining REGs except for the RS and the PCFICH (first OFDM symbol) on each OFDM symbol into three parts.

Referring to FIG. 11, three PHICH allocation blocks are divided from one another in the frequency domain, and PHICH groups are continuously allocated to each allocation block. In FIG. 11, the same number represents the same PHICH group. A PHICH period is restricted by a maximum size of the control region, and corresponds to one to three OFDM symbols. If a plurality of OFDM symbols are used for the PHICH, REGs that belong to the same PHICH group, are used for transmit diversity by using different OFDM symbols.

Referring to FIG. 4 again, the PDCCH is allocated to first n number of OFDM symbols of the subframe, wherein n is an integer greater than 1, is indicated by the PCIFCH, and n=1, 2, 3. The PDCCH is allocated in a unit of CCE, and one CCE includes nine REGs. The PDCCH indicates information related to resource allocation of transport channels, i.e., a paging channel (PCH) and a downlink-shared channel (DL-SCH), uplink scheduling grant, HARQ information, etc.

The paging channel (PCH) and the downlink-shared channel (DL-SCH) are transmitted through the PDSCH. Accordingly, the base station and the user equipment respectively transmit and receive data through the PDSCH except for specific control signal or specific service data. Information as to user equipment(s) (one user equipment or a plurality of user equipments) to which data of the PDSCH are transmitted, and information as to how the user equipment(s) receives and decodes PDSCH data are transmitted by being included in the PDCCH.

For example, it is assumed that a specific PDCCH is CRC masked with radio network temporary identity (RNTI) called "A," and information of data transmitted using a radio resource (for example, frequency location) called "B" and transmission format information (for example, transport block size, modulation mode, coding information, etc.) called "C" is transmitted through a specific subframe. In this case, one or more user equipments located in a corresponding cell monitor the PDCCH by using their RNTI information, and if there are one or more user equipments having RNTI called "A", the user equipments receive the PDCCH, and receive the PDSCH indicated by "B" and "C" through information of the received PDCCH.

2. Multi-Carrier Aggregation Environment

A communication environment considered by the embodiments of the present invention includes a multi-carrier environment. In other words, a multi-carrier system or multi-carrier aggregation system used in the present invention means a system that one or more carriers having a bandwidth smaller than a target bandwidth are aggregated when a target wideband is configured, to support a wideband.

In the present invention, multi-carrier means aggregation of carriers (or carrier aggregation). At this time, carrier aggregation means aggregation between non-neighboring carriers as well as aggregation between neighboring carriers. Also, carrier aggregation may be used to refer to bandwidth aggregation.

Multi-carrier (that is, carrier aggregation) configured by aggregation of two or more component carriers (CC) aims to support a bandwidth of 100 MHz in the LTE-A system. When one or more carriers having a bandwidth smaller than a target bandwidth are aggregated, a bandwidth of the aggregated carriers may be limited to a bandwidth used in the existing system to maintain backward compatibility with the existing IMT system.

For example, the 3GPP LTE system according to the related art supports bandwidths of {1.4, 3, 5, 10, 15, 20} MHz, and the 3GPP LTE_advanced system (that is, LTE_A) may support a bandwidth greater than 20 MHz using the above bandwidths supported by the LTE system. Also, the multi-carrier system used in the present invention may support carrier aggregation by defining a new bandwidth regardless of the bandwidth used in the existing system.

The LTE-A system uses a concept of cell to manage radio resources. The cell is defined by combination of downlink resources and uplink resources, wherein the uplink resources are not essential elements of the cell. Accordingly, the cell may be configured by downlink resources only, or may be configured by downlink resources and uplink resources. If multi-carrier (that is, carrier aggregation) is supported, linkage between carrier frequency (or DL CC) of the downlink resources and carrier frequency (or UL CC) of the uplink resources may be indicated by system information (SIB).

The cell used in the LTE-A system includes a primary cell (PCell) and a secondary cell (SCell). The P cell may mean a cell operated on the primary frequency (for example, PCC: primary CC), and the S cell may mean a cell operated on the secondary frequency (for example, SCC: secondary CC). However, a single P cell may be allocated to a specific user equipment, and one or more S cells may be allocated to the specific user equipment.

The P cell is used such that the user equipment performs an initial connection establishment procedure or connection re-establishment procedure. The P cell may refer to a cell indicated during a handover procedure. The S cell may be configured after RRC connection is established, and may be used to provide an additional radio resource.

The P cell and the S cell may be used as serving cells. Although the user equipment is in RRC-CONNECTED state, if it is not set by carrier aggregation or does not support carrier aggregation, a single serving cell configured by the P cell only exists. On the other hand, if the user equipment is in the RRC-CONNECTED state and is set by carrier aggregation, one or more serving cells may exist, wherein the serving cells may include a P cell and one or more S cells.

After an initial security activity procedure starts, the E-UTRAN may configure a network that includes one or more S cells in addition to a P cell initially configured during a connection establishment procedure. In the multi-carrier environment, the P cell and the S cell may be operated as component carriers, respectively. In other words, multi-carrier aggregation may be understood by aggregation of the P cell and one or more S cells. In the following embodiment, the primary component carrier (PCC) may be used to refer to the P cell, and the secondary component carrier (SCC) may be used to refer to the S cell.

3. Method for Transmitting Downlink Control Information for MTC Device

The embodiments of the present invention provide various methods for transmitting downlink control information in an operation of a low cost MTC device based on the LTE (Rel-8/9)/LTE-A (Rel-10/11) system. In case of low cost MTC devices, a structure of hardware of the MTC device should be simplified to reduce the cost for manufacturing the device. Accordingly, in order that the MTC device of a simplified structure easily searches for and receive control information, a new method for transmitting and receiving control information will be required. In particular, the low cost MTC device of the present invention is operated based on the LTE system or the LTE-A system. Accordingly, the description of the aforementioned sections 1 and 2 may be applied to the embodiments of the present invention, which will be described later.

3.1 Downlink Control Information (DCI) Format

Downlink control information on a low cost MTC device (hereinafter, referred to as MTC device) has a size relatively smaller than that of downlink control information of a general user equipment used in the LTE/LTE-A system. Accordingly, a new DCI format may be defined to transmit downlink control information for the MTC device.

For example, the downlink control information for the MTC device may be used by a specific DCI format. In other words, the base station may transmit DCI to all the MTC devices by using only one DCI format.

At this time, the DCI format of the MTC device may be a new DCI format in addition to a DCI format defined in the LTE/LTE-A system of the related art, or one of DCI formats used conventionally may be used for MTC.

3.2 Method for Transmitting DCI Format Information

In order that the MTC device may reduce a search time and search process for detecting a PDCCH signal accompanied with DCI and a power consumed for the search time and the search process, information on a DCI format, which will be used by the MTC device, may previously be notified to the MTC device.

Figure 12:
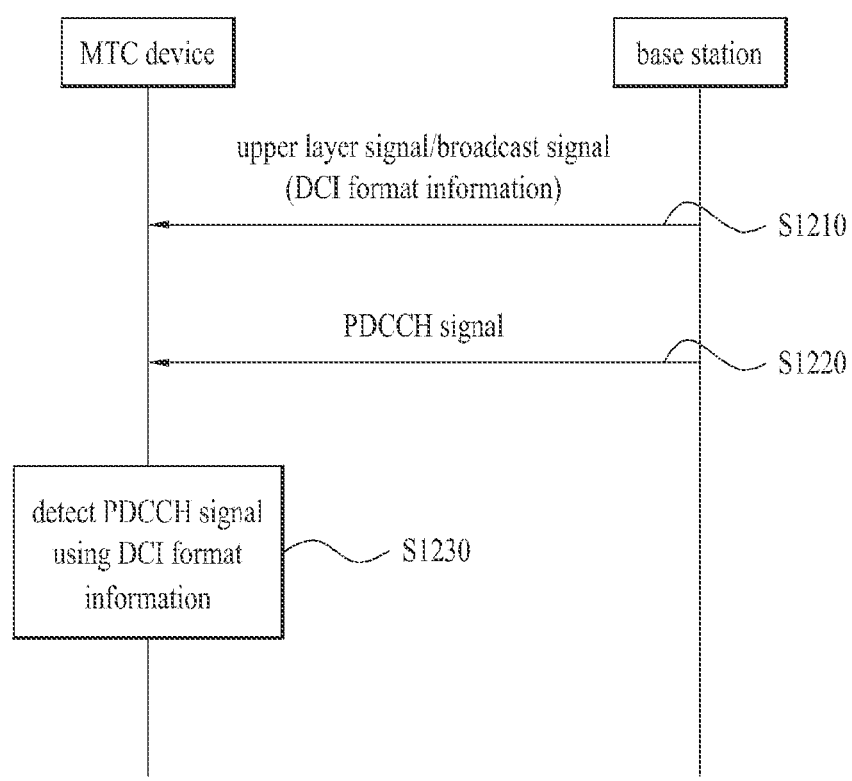
FIG. 12 is a diagram illustrating one of methods for transmitting control information as an embodiment of the present invention.

FIG. 12 is a diagram illustrating one of methods for transmitting control information as an embodiment of the present invention.

Referring to FIG. 12, the base station may transmit DCI format information on the DCI format for transmitting downlink control information to each MTC device through a high layer signal (S1210).

The base station may transmit a PDCCH signal, which includes downlink control information, to the MTC device by using the DCI format information (S1220).

At this time, the same DCI format may be used for the MTC devices which belong to the same cell. Alternatively, different DCI formats may be used for low cost MTC devices which belong to the same cell.

The MTC devices may decode the PDCCH signal by using the DCI format information received through the upper layer signal. For example, the MTC device may reduce a search time and search process for detecting the PCCCH by decoding the PDCCH signal only represented by the DCI format information without searching for all the search spaces to receive the PDCCH signal, and may reduce power consumption caused by the search time and the search process (S1230).

At the step S1210, the base station may transmit the DCI format information to the MTC devices of the corresponding cell through a broadcast signal instead of the upper layer signal. In this case, it is preferable that the DCI format has the same format within the corresponding cell.

3.3 Size of PDCCH Resource

In the LTE/LTE-A system, the downlink control information is coded by a size only determined in the PDCCH and then transmitted. At this time, in order that the MTC device reduces complexity of hardware required for a procedure of receiving downlink control information and the power consumed for the procedure, a size and a location of the resource, to which the PDCCH signal, which includes downlink control information, is transmitted, may be fixed per device. Alternatively, the base station may notify each MTC device of the size and the location of the PDCCH resource through the upper layer signal.

The DCI transmitted to the low cost MTC device based on the LTE/LTE-A system may be transmitted at a specific one of a plurality of CCE aggregation levels. For example, the PDCCH signal for MTC may be transmitted using 1 CCE.

Alternatively, DCI may be transmitted at a limited size smaller than that of CCE. For example, the DCI may have a size of 1/n of 1 CCE or a size of 1/a ('a' is a divisor of 9 not 1 or 9 (if 'a' is 9, it is REG size)) of 1 CCE by considering that one CCE includes nine REGs.

3.4 Location of PDCCH Resource

DCI transmitted to the MTC device based on the LTE/LTE-A system may be transmitted through a resource or a region of a given location of the PDCCH. For example, the DCI may be transmitted through the following regions.

3.4.1 DCI may always be transmitted through a PDCCH region where 1 CCE resource is scheduled.

3.4.2 DCI may always be transmitted within a given interval only of a corresponding region just after a common search space (CSS).

3.4.3 DCI may always be transmitted through a PDCCH region calculated from a base station identifier of the MTC device.

3.4.4 DCI may always be transmitted through a PDCCH region represented by PDCCH region information transmitted to the MTC device through an upper layer signal.

3.4.5 DCI transmitted to the MTC device may be limited to the CSS only.

3.4.6 DCI transmitted to the MTC device may be limited to a user equipment specific search space (USS) only.

3.5 MTC Device Grouping

Hereinafter, various methods for grouping low cost MTC devices based on the LTE/LTE-A system and transmitting DCI to the grouped MTC devices will be described. The PDCCH signal of one MTC device may be smaller than a CCE size. At this time, the MTC devices may be grouped, and DCI size of the grouped MTC devices may be adjusted to 1 CCE aggregation level, whereby compatibility with the LTE/LTE-A system of the related art may be maintained.

3.5.1 One PDCCH transmission resource used in the LTE/LTE-A system may be used for DCI transmission for a plurality of MTC devices. For example, n CCE size may be used for DCI transmission for m number of MTC devices.

3.5.2 One PDCCH transmission resource (for example, 4 CCE or 8 CCE aggregation) in a CSS region of the LTE/LTE-A system may be used for downlink control information transmission for a plurality of MTC devices. At this time, DCI transmission for the MTC devices may be limited to the PDCCH transmission resource only.

3.5.3 The base station may transmit DCI on a plurality of MTC devices (for example, MTC group) through joint coding. At this time, MTC group RNTI (Radio Network Temporary Identity) may be defined and used for CRC masking.

3.5.4 A size of the DCI format may be limited to 4 CCE aggregation level, which is common for CSS and USS, during DCI transmission of the MTC group, whereby a joint coding DCI format for the MTC devices may be defined and used.

3.5.5 The base station may transmit DCI on n number of MTC devices at 1 CCE aggregation level through joint coding. Also, the base station linearly transmits DCI on m*n number of MTC devices at m CCE aggregation level through joint coding. In other words, basic design where DCI on n number of MTC devices is joint-coded at 1 CCE aggregation level may be applied to m CCE aggregation level.

3.6 DCI Transmission Through PDSCH Region

DCI transmitted to the MTC device based on the LTE/LTE-A system may be transmitted through a PDSCH region. Hereinafter, various methods for transmitting DCI through a PDSCH region will be described.

Figure 13:
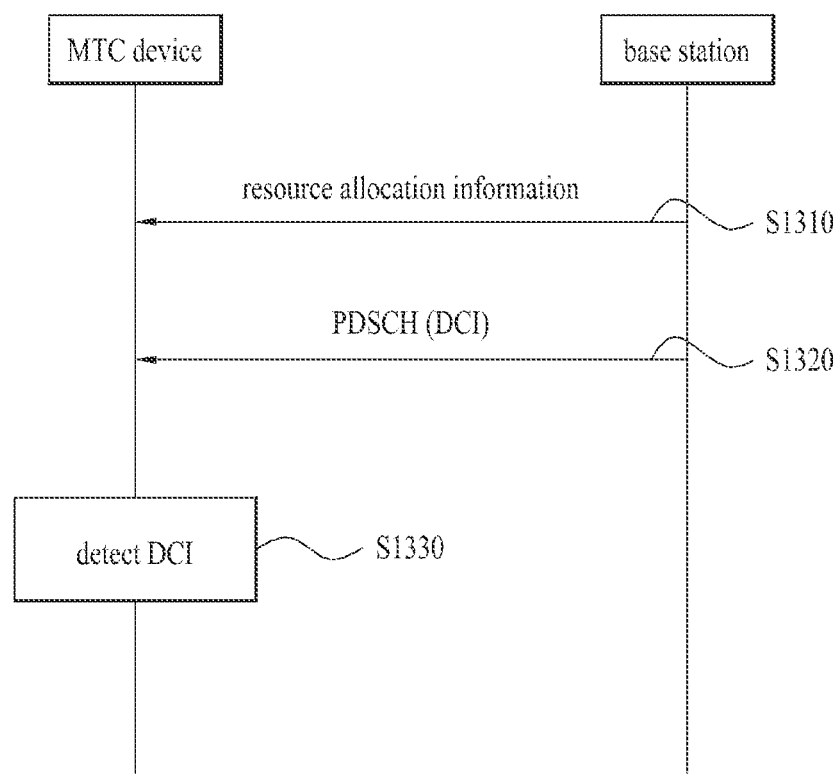
FIG. 13 is a diagram illustrating an example of a method for transmitting DCI of an MTC device through a PDSCH region as an embodiment of the present invention.

FIG. 13 is a diagram illustrating an example of a method for transmitting DCI of an MTC device through a PDSCH region as an embodiment of the present invention.

The base station may transmit DCI to the MTC device through a PDSCH region. To this end, the base station may allocate the PDSCH region. At this time, resource allocation information on the PDSCH region to which the DCI is transmitted may be transmitted to the MTC device through an upper layer signal (S1310).

At this time, the PDSCH region to which the DCI is transmitted may be allocated to the first slot only of each subframe.

Alternatively, the PDSCH region to which the DCI is transmitted may be transmitted from a designated location only of a downlink channel. At this time, the designated location may previously be set on the system, or the base station may notify the MTC device of resource allocation information on the PDSCH location.

Also, the location of the PDSCH region may be equal to a plurality of MTC devices. In this case, the base station may transmit the DCI on the plurality of MTC devices through joint coding.

Accordingly, the MTC device may receive a PDSCH signal, which includes DCI, on the basis of the received resource allocation information, and may detect the DCI from the PDSCH signal (S1320, S1330).

In FIG. 13, if the PDSCH region to which the DCI is transmitted is previously set, the step S1310 may not be performed. Also, if the base station transmits resource allocation information on the PDSCH region allocated to a specific MTC device at the designated location of the downlink channel, the base station may use a specific password for the corresponding MTC device to prevent the other MTC device from reading resource allocation information, or may scramble resource allocation information by using a specific sequence for the MTC device.

4. Configuration Apparatus

FIG. 14 is a diagram illustrating an apparatus through which the methods described in FIGS. 1 to 13 may be implemented.

The user equipment (UE) may be operated as a transmitter on an uplink and as a receiver on a downlink. Also, the base station (eNB: e-Node) may be operated as a receiver on the uplink and as a transmitter on the downlink.

In other words, each of the user equipment and the base station may include a transmission (Tx) module 1440, 1450 and a reception (Rx) module 1460, 1470 to control transmission and reception of information, data and/or message, and an antenna 1400, 1410 for transmitting and receiving information, data and/or message.

Also, each of MTC device and the base station may include a processor 1420, 1430 for performing the aforementioned embodiments of the present invention and a memory 1480, 1490 for temporarily or continuously storing a processing procedure of the processor.

The embodiments of the present invention may be performed using elements and functions of the aforementioned MTC device and the base station. The processor of the MTC device may receive a PDCCH signal (that is, DCI) by monitoring a search space. In particular, the MTC device used in the LTE-A system may receive a PDCCH without blocking for the PDCCH signal with another LTE MTC device by performing blind decoding (BD) for an extended CSS.

The transmission module and the reception module included in the MTC device and the base station may perform a packet modulation and demodulation function for data transmission, a quick packet channel coding function, an orthogonal frequency division multiple access (OFDMA) packet scheduling, time division duplex (TDD) packet scheduling and/or channel multiplexing function. Also, the MTC device and the base station of FIG. 14 may further include a low power radio frequency (RF)/intermediate frequency (IF) module.

The embodiments according to the present invention may be implemented by various means, for example, hardware, firmware, software, or their combination.

If the embodiments according to the present invention are implemented by hardware, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the method according to the embodiments of the present invention may be implemented by a type of a module, a procedure, or a function, which performs functions or operations described as above. For example, a software code may be stored in the memory unit 1480, 1490 and then may be driven by the processor 1420, 1430. The memory unit may be located inside or outside the processor to transmit and receive data to and from the processor through various means which are well known.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The aforementioned embodiments of the present invention may be applied to various wireless access systems. Examples of the various wireless access systems include 3GPP LTE system, 3GPP2 and/or IEEE 802.xx (Institute of Electrical and Electronic Engineers 802) system. The embodiments of the present invention may be applied to all the technical fields based on the various wireless access systems as well as the various wireless access systems.

The invention claimed is:

1. A method for receiving downlink control information (DCI) for low cost machine type communication (MTC) device, the method comprising:
receiving, via upper layer signaling, resource allocation information about resources allocated in a physical downlink control channel (PDCCH) or a physical downlink shared channel (PDSCH) carrying the DCI for the MTC device, the resource allocation information including a location information and a size information of the DCI within the PDCCH or the PDSCH;
decoding the PDCCH or the PDSCH carrying the DCI based on the resource allocation information about the DCI only at a designated location indicated by the resource allocation information without searching a search space for the DCI,
wherein the DCI is configured to have a size smaller than one control channel element (CCE) and the DCI has a size of 1/a of the one CCE, where a is 3 or 9.

2. The method according to claim 1, wherein the resource allocation information is scrambled with MTC device-specific sequence.

3. The method according to claim 1, wherein the DCI is configured in unit of resource element group (REG).

4. The method according to claim 1, wherein the designated location locates immediately after a common search space.

5. The method according to claim 1, wherein, when a plurality of MTC devices exists in the cell to which the MTC device belongs, the DCI is transmitted with DCI for other MTC device via one CCE within PDCCH region for one CCE aggregation level.

6. The method of claim 1, wherein the PDCCH comprises the one control channel element (CCE), the one CCE including nine resource element groups (REGs).

7. A machine type communication (MTC) device for receiving downlink control information (DCI) for the MTC device, the MTC device comprising:
a receiver; and
a processor operatively connected to the receiver and configured to
receive, via upper layer signaling, resource allocation information about resources allocated in a physical downlink control channel (PDCCH) or a physical downlink shared channel (PDSCH) carrying the DCI for the MTC device, the resource allocation information including a location information and a size information of the DCI within the PDCCH or the PDSCH carrying the DCI, and
decode the PDCCH or the PDSCH carrying the DCI based about the resource allocation information on the DCI only at a designated location indicated by the resource allocation information without searching a search space for the DCI,
wherein the DCI is configured to have a size smaller than one control channel element (CCE), and the DCI has a size of 1/a of the one CCE, where a is 3 or 9.

8. The MTC device according to claim 7, wherein the resource allocation information is scrambled with MTC device-specific sequence.

9. The MTC device according to claim 7, wherein the DCI is configured in unit of resource element group (REG).

10. The MTC device according to claim 7, wherein the designated location locates immediately after a common search space.

11. The MTC device according to claim 7, wherein, when a plurality of MTC devices exists in the cell to which the MTC device belongs, the DCI is transmitted with DCI for other MTC device via one CCE within PDCCH region for one CCE aggregation level.

12. The MTC device according to claim 7, wherein the PDCCH comprises the one control channel element (CCE), the one CCE including nine resource element groups (REGs).

\* \* \* \* \*